US010559081B2

(12) United States Patent
Omer et al.

(10) Patent No.: US 10,559,081 B2
(45) Date of Patent: *Feb. 11, 2020

(54) METHOD AND SYSTEM FOR AUTOMATED VISUAL ANALYSIS OF A DIPSTICK USING STANDARD USER EQUIPMENT

(71) Applicant: HEALTHY.IO LTD, Tel Aviv (IL)

(72) Inventors: Ido Omer, Ramat Hasharon (IL); Yonatan Adiri, Tel Aviv (IL); Shachar Mendelowitz, Tel Aviv (IL); Roee Salomon, Herzliya (IL)

(73) Assignee: HEALTHY.IO LTD, Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/120,335

(22) Filed: Sep. 3, 2018

(65) Prior Publication Data
US 2018/0374215 A1 Dec. 27, 2018

Related U.S. Application Data

(63) Continuation of application No. 15/050,710, filed on Feb. 23, 2016, now Pat. No. 10,068,329, which is a
(Continued)

(51) Int. Cl.
G06K 9/46 (2006.01)
G06T 7/00 (2017.01)
G06T 5/00 (2006.01)

(52) U.S. Cl.
CPC .......... G06T 7/0012 (2013.01); G06K 9/4652 (2013.01); G06K 9/4661 (2013.01);
(Continued)

(58) Field of Classification Search
CPC ......... G06T 5/007; G06T 7/0012; G06T 7/90; G06T 2207/30072; G06T 2207/10024;
(Continued)

(56) References Cited

U.S. PATENT DOCUMENTS 4,523,852 A * 6/1985 Bauer ................. G01J 3/52
356/243.5
7,652,268 B2 1/2010 Patel
(Continued)

FOREIGN PATENT DOCUMENTS

WO WO-2012131386 A1 * 10/2012 ......... G01N 21/8483
WO WO/2013077802 5/2013
(Continued)

OTHER PUBLICATIONS

Loh, B. Y., N. K. Vuong, S. Chan, and C. T. Lau. "Automated Mobile pH Reader on a camera phone." IAENG International Journal of Computer Science 38, No. 3 (2011): 268-274. (Year: 2011).*
(Continued)

Primary Examiner — Carol Wang
(74) Attorney, Agent, or Firm — Finnegan, Henderson, Farabow, Garrett & Dunner LLP

(57) ABSTRACT

A method for analyzing a dipstick using a smartphone is provided herein. The method includes: capturing an image containing: a dipstick having colored test reagents, and a color board having a grid of grey patches and a plurality of reference color patches; deriving, based on the grid, local illumination parameters associated with the colored test reagents and the plurality of reference color patches; determining whether illumination parameters are sufficient for interpreting the colored test reagent; in a case the illumination parameters are insufficient, notifying a user that an interpretation of the colored test reagents is not possible, otherwise, applying one or more image enhancement operation to the captured image, based on an analysis of the grid of grey patches, to yield enhanced reference color patches; and interpreting the one or more colored test reagents, by
(Continued)

projecting the colored test reagents onto a vector of the enhanced reference color patches.

20 Claims, 3 Drawing Sheets
(1 of 3 Drawing Sheet(s) Filed in Color)

Related U.S. Application Data continuation-in-part of application No. PCT/IL2015/050487, filed on May 11, 2015, and a continuation-in-part of application No. 14/274,817, filed on May 12, 2014, now Pat. No. 9,972,077.

(52) U.S. Cl.
CPC .... *G06T 5/007* (2013.01); *G06T 2207/10024* (2013.01); *G06T 2207/30072* (2013.01)

(58) Field of Classification Search
CPC ........ G06T 2207/30004; G06K 9/2027; G06K 9/4652; G06K 9/4661; G06K 2009/4666
See application file for complete search history.

(56) References Cited

U.S. PATENT DOCUMENTS

| | | | | |
|---|---|---|---|---|
| 8,877,140 | B2* | 11/2014 | Chen | G06T 7/0012 422/400 |
| 2007/0024657 | A1* | 2/2007 | Zhang | H04N 1/6033 347/19 |
| 2012/0063652 | A1* | 3/2012 | Chen | G01N 21/274 382/128 |
| 2013/0267032 | A1* | 10/2013 | Tsai | G01N 21/78 436/95 |
| 2014/0072189 | A1* | 3/2014 | Jena | G01N 21/8483 382/128 |
| 2015/0055134 | A1* | 2/2015 | Papautsky | G01N 21/25 356/408 |
| 2015/0211987 | A1* | 7/2015 | Burg | G01N 35/00029 356/402 |
| 2015/0278575 | A1* | 10/2015 | Allano | G06K 9/00127 382/133 |

FOREIGN PATENT DOCUMENTS

| | | |
|---|---|---|
| WO | WO/2013/116831 | 8/2013 |
| WO | WO/2014025415 | 2/2014 |

OTHER PUBLICATIONS

Vuong, N. K., S. Chan, and C. T. Lau. "Classification of pH levels using a mobile phone." In Consumer Electronics, 2009. ISCE'09. IEEE 13th International Symposium on, pp. 823-827. IEEE, 2009. (Year: 2009).*

Filippini, Daniel, and Ingemar Lundström. "Measurement strategy and instrumental performance of a computer screen photo-assisted technique for the evaluation of a multi-parameter colorimetric test strip." Analyst 131, No. 1 (2006): 111-117. (Year: 2006).*

Shen, Li, Joshua A. Hagen, and Ian Papautsky. "Point-of-care colorimetric detection with a smartphone." Lab on a Chip 12, No. 21 (2012): 4240-4243. (Year: 2012).*

International search report of PCT Application No. PCT/IL2015/050487 dated Sep. 16, 2015.

Office Action of U.S. Appl. No. 14/274,817, dated Jul. 15, 2016.

Notice of Allowance for U.S. Appl. No. 14/274,817, dated Jan. 19, 2018.

Supplementary European Search Report for Application No. EP15792976.1, dated Oct. 10, 2017.

Final Office Action for U.S. Appl. No. 14/274,817, dated May 4, 2017.

Office Action for U.S. Appl. No. 15/050,710, dated Sep. 7, 2017.

* cited by examiner

METHOD AND SYSTEM FOR AUTOMATED VISUAL ANALYSIS OF A DIPSTICK USING STANDARD USER EQUIPMENT

CROSS REFERENCE TO RELATED APPLICATIONS

This application is a continuation of U.S. patent application Ser. No. 15/050,710, filed on Feb. 23, 2016, being a continuation-in-part of PCT International Patent Application No. PCT/IL2015/050487, filed on May 11, 2015, and is a continuation-in-part of U.S. patent application Ser. No. 14/274,817, filed on May 12, 2014, now U.S. Pat. No. 9,972,077, all of which are incorporated herein by reference in their entireties

FIELD OF THE INVENTION

The present invention relates generally to systems and methods of automatically analyzing dipsticks, and in particular to such methods implementing image processing techniques tailored for standard user equipment.

BACKGROUND OF THE INVENTION

Prior to a short discussion of the related art being set forth, it may be helpful to set forth definitions of certain terms that will be used hereinafter.

The term "mobile device" refers herein to any device used directly by an end-user to communicate. It can be a hand-held telephone, a laptop computer equipped with a mobile broadband adapter, or any other device. In the context used herein, mobile device refers specifically to an arbitrary platform which is equipped with image capturing, image processing, and wireless communication capabilities.

The term "testing dipstick" or simply "dipstick" refers herein to a testing measurement device usually made of paper or cardboard and is impregnated with reagents that indicate some feature of a liquid or a gas by changing color. In medicine, dipsticks can be used to test for a variety of liquids for the presence of a given substance, known as an analyte. For example, urine dipsticks are used to determine properties of a given sample and detect and measure the presence of a variety of substances that indicate a person's state of health.

The term "specularity" refers herein to the visual appearance of specular reflection. In computer vision, it means the mirror like properties of the surface: A directional reflection of incoming light (illumination) as described by the law of reflection. A simplified modeling of that reflection is the specular component in the Phong reflection model.

Dipsticks are used by a variety of healthcare providers to assist in diagnostics, specifically, but not exclusively of urinary analysis of patients. The core concept is a set of reagents which are designed to chemically react to substances in a liquid under test (e.g., urine) by changing their color within a predefined color range. The set of colored reagents can then be compared to a predefined color key which can be used, either manually (e.g., by an expert user) or automatically (e.g., using a dedicated image processing computerized system) to yield qualitative and quantitative data relating to the substances in the liquid under test.

Currently, computer vision can be used to interpret the color reagent responses into quantitative and qualitative clinical data. This is being carried out by dedicated hardware which may include a pre-calibrated scanner, which is operated in well-known and monitored illumination conditions, and a classifier that operates based on the calibrated images derived by the scanner.

The need to use dedicated hardware necessitates patients carry out the dipstick test in clinics rather than in the convenience of their home or other place of choice. Such a visit to the lab also mandates coming in unnecessary contact with infections and diseases. A non-expert interpretation of the dipstick is also not recommended—for the fear of wrong interpretation and misdiagnosis. It would, therefore, be advantageous to be able to produce such accurate clinical data at home, using image processing techniques, without the need to use a dedicated hardware or software.

SUMMARY OF THE INVENTION

Some embodiments of the present invention overcome the aforementioned disadvantages of the prior art by enabling a non-expert user to carry out computerized, automatic interpretation of a dipstick, using a standard arbitrary platform at his or her location of choice.

According to one embodiment of the present invention, there is provided a method of visual analysis of a dipstick using user equipment having optical capturing and image processing capabilities. The method may include the following steps: capturing an image containing: a dipstick having colored test reagents, and a color board having a grid of grey patches and a plurality of reference color patches; deriving, based on the grid, local illumination parameters associated with the colored test reagents and the plurality of reference color patches; determining whether illumination parameters are sufficient for interpreting the colored test reagent; in a case the illumination parameters are insufficient, notifying a user that an interpretation of the colored test reagents is not possible, otherwise, applying one or more image enhancement operation to the captured image, based on an analysis of the grid of grey patches, to yield enhanced reference color patches; and interpreting the one or more colored test reagents, by projecting the colored test reagents onto a vector of the enhanced reference color patches.

Advantageously, by some embodiments of the present invention, the dipstick-specific color board can, in real time, determine whether the environment of choice crosses boundary conditions.

These additional, and/or other aspects and/or advantages of the present invention are set forth in the detailed description which follows.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a better understanding of the invention and in order to show how it may be implemented, references are made, purely by way of example, to the accompanying drawings in which like numerals designate corresponding elements or sections. In the accompanying drawings:

Examples illustrative of some embodiments of the invention are described below with reference to the figures attached hereto. In the figures, identical structures, elements or parts that appear in more than one figure are generally labeled with the same number in all the figures in which they appear. Dimensions of components and features shown in the figures are generally chosen for convenience and clarity of presentation and are not necessarily shown to scale.

Figure 1:
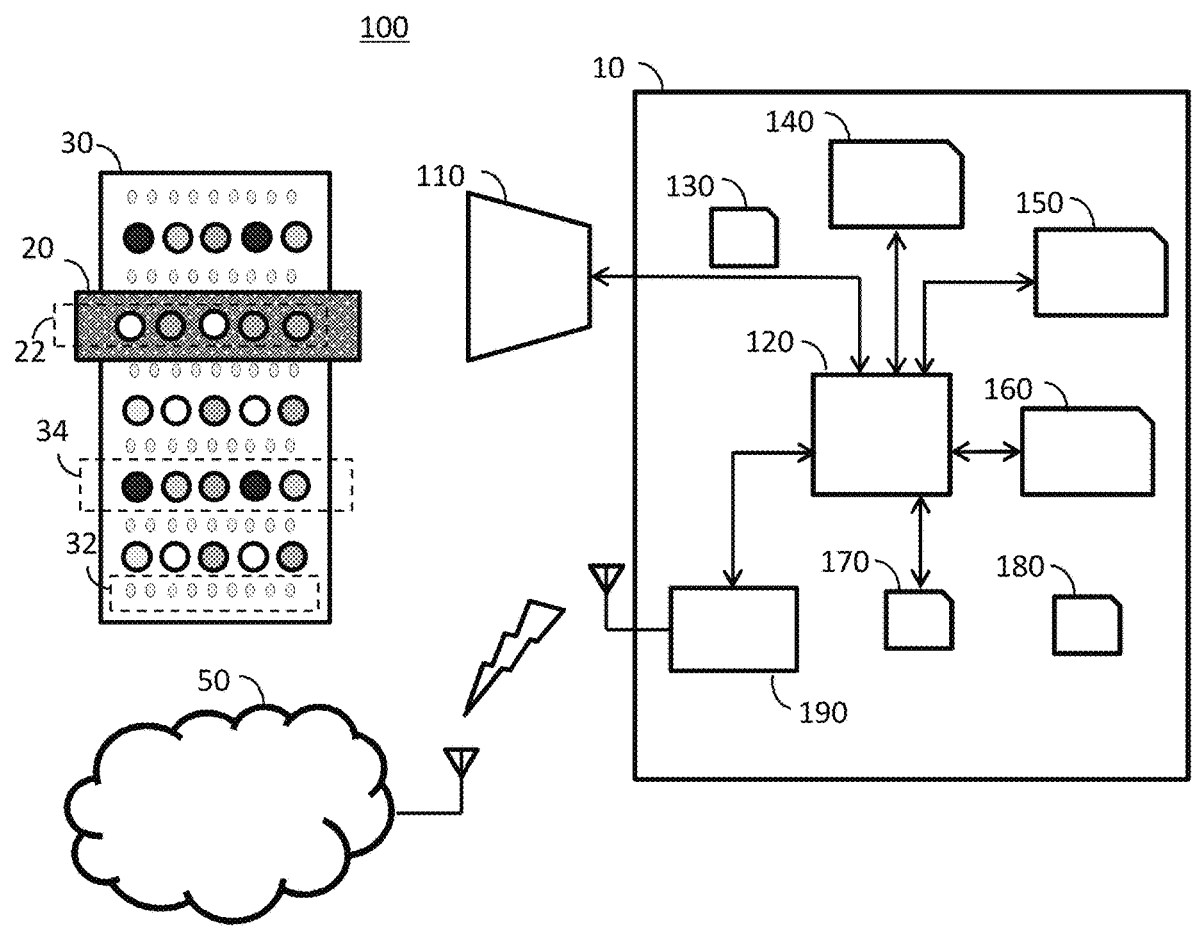
Figure 2:
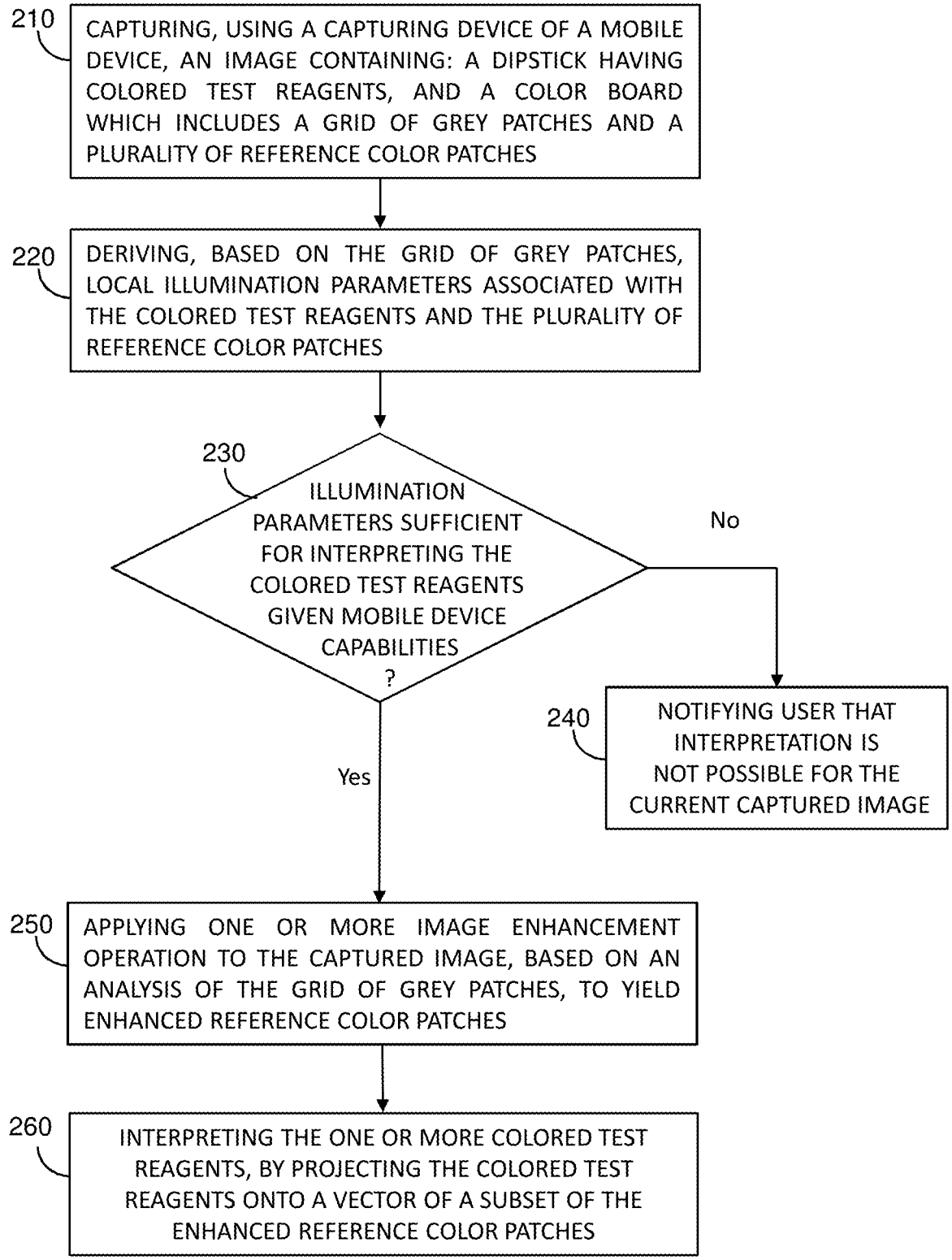
Figure 3:
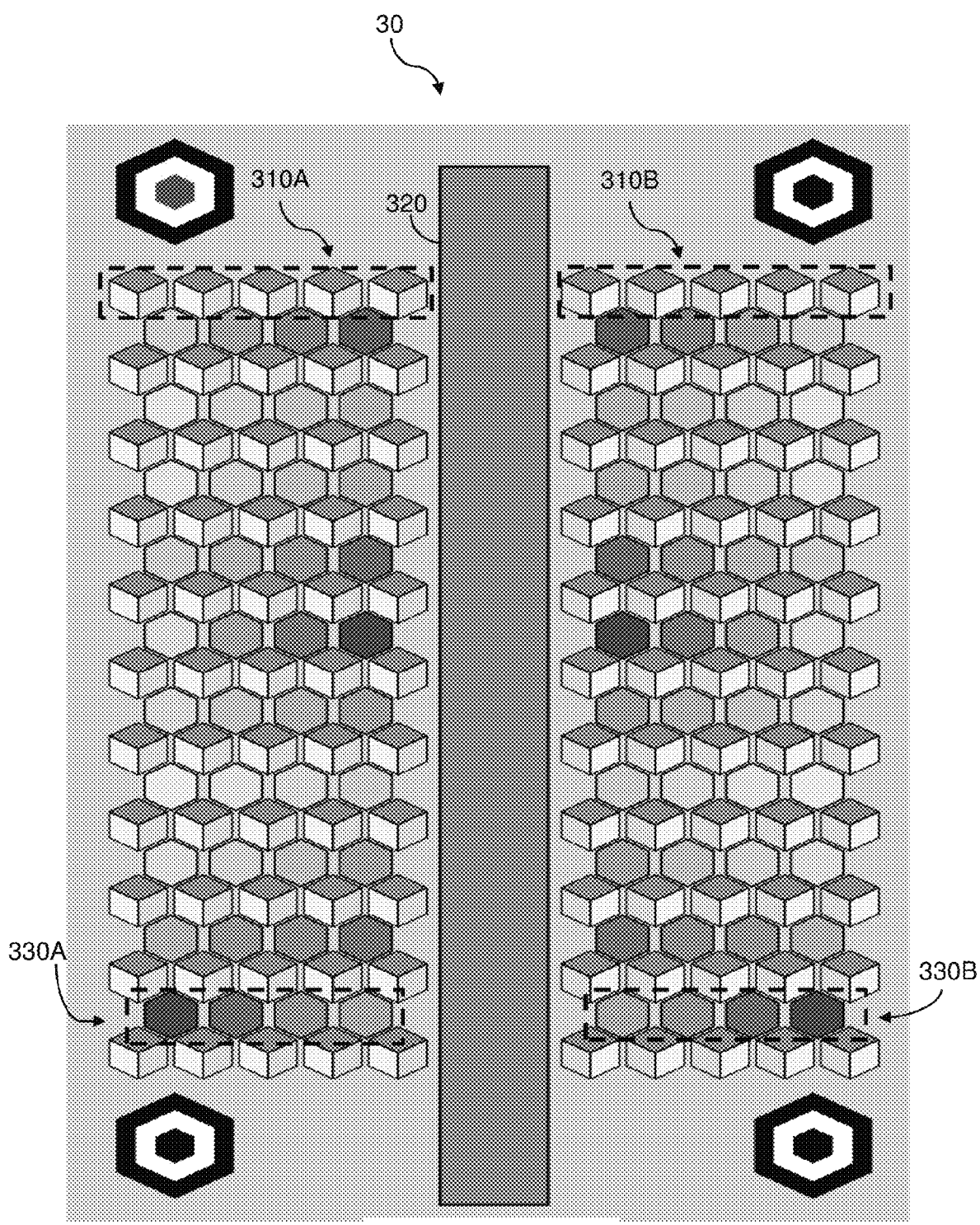

FIG. 1 is a high level schematic block diagram illustrating a system according to the present invention;

FIG. 2 is a high level flowchart diagram illustrating an aspect of a method according to some embodiments of the present invention; and FIG. 3 is an exemplary non-limiting color boards illustrating an aspect of some embodiments of the present invention.

The drawings together with the following detailed description make the embodiments of the invention apparent to those skilled in the art.

DETAILED DESCRIPTION OF THE INVENTION

With specific reference now to the drawings in detail, it is stressed that the particulars shown are for the purpose of example and solely for discussing the preferred embodiments of the present invention, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings makes apparent to those skilled in the art how the several forms of the invention may be embodied in practice.

Before explaining the embodiments of the invention in detail, it is to be understood that the invention is not limited in its application to the details of construction and the arrangement of the components set forth in the following descriptions or illustrated in the drawings. The invention is applicable to other embodiments or of being practiced or carried out in various ways. Also, it is to be understood that the phraseology and terminology employed herein is for the purpose of description and should not be regarded as limiting.

Some embodiments of the present invention provide a system which includes: a mobile device having specified image capturing and processing capabilities, configured to capture an image of a dipstick having colored test reagents, and an array of patches containing a grid of grey patches and a plurality of reference color patches; and a computer processor configured to: derive, based on the grid of grey patches, local illumination parameters associated with the colored test reagents and the plurality of reference color patches; determine whether illumination parameters are sufficient for interpreting the colored test reagent given mobile device capabilities; in case they are insufficient, notify user that interpretation is not possible for the current captured image, otherwise, apply one or more image enhancement operation to the captured image, based on an analysis of the grid of grey patches indicative of local illumination conditions; and interpret the one or more colored test reagents, by projecting the colored test reagents onto a vector of relevant reference color patches.

FIG. 1 is a high level schematic block diagram illustrating a system 100 according to some embodiments of the present invention. System 100 may include an arbitrary platform 10 such as a mobile device having an image capturing device 110 having specified image capturing and a computer processor 120 processing capabilities. Capturing device 110 may be configured to capture one or more images of a dipstick 20 having one or more colored test reagents 22, and a pre-generated color board 30 having a plurality of colored reference elements, such as colored elements 34.

In accordance with some embodiments of the present invention, reference elements 34 are tailored specifically for dipstick 20 color reagents, and are generated for each type of dipstick based on its properties. It is understood that a single color board may be tailored for a plurality of dipsticks, as long as it is tailored to a group of dipsticks and not all possible dipsticks.

Computer processor 120 may be configured to: derive, based on grid of grey patches 32 of the captured image 130, local illumination parameters 140 associated with dipstick 20 and the color board 30. Computer processor 120 may further be configured to determine whether the illumination and other parameters such as the spatial angle of the mobile device relative to the color board are within predefined illumination boundary conditions 150 which are sufficient for interpreting the one or more colored test reagents, given the specified image capturing and processing capabilities of arbitrary platform (or mobile device) 10.

In some embodiments of the present invention, computer processor 120 may further be configured to apply one or more image enhancement operation 160 on the captured image, wherein the image enhancement operation 160 is configured for rendering the color reagents at captured image more distinguishable and less prone to artifacts; and interpret the one or more colored test reagents, based on the colored calibration setup, in the enhanced captured image 170.

It should be noted that in accordance with some embodiments of the present invention, since the dipstick and the color board are separate objects (that are held together for the capturing), a separate step of extracting the dipstick is required.

In an alternative embodiment, aforementioned enhancement operation 160 may be carried on a location remote to arbitrary platform 10 such as one or more servers on a cloud network 50, to which arbitrary platform 10 may be connected, e.g., by a Wi-Fi connection using communication circuitry 190. In case wireless connection is not available, the data may be stored on mobile device 10 and transmitted later to cloud 50 once wireless connectivity is resumed.

According to some embodiments of the invention, in a case that the illumination parameters are not within the predefined illumination boundary conditions, instructing a user of the arbitrary platform with instructions 180 how to improve the illumination parameters.

According to some embodiments of the invention, the one or more image enhancement operation may include detecting portions of specular reflections coming from the colored calibration shapes or the colored test reagents, and applying image processing algorithms that reduce the specular reflections.

According to some embodiments of the invention, the one or more image enhancement operation comprises determining, for each pixel at the captured image associated with one of the colored test reagents, a uniform color, based on a normalization factor calculated based on the derived illumination parameters and the specified image capturing and processing capabilities.

According to some embodiments of the invention, in a case that the illumination parameters are not within the predefined illumination boundary conditions, indicating to a user that interpreting of the dipstick by the arbitrary platform is not possible.

According to some embodiments of the invention, wherein the one or more colored test reagents, and the colored reference elements are located, based on a specified layout, in prearranged locations.

According to some embodiments of the invention, the instructions to the user indicate a specified movement pattern of the arbitrary platform vis-à-vis the dipstick and the color board.

According to some embodiments of the invention, the detecting of portions of specular reflections is carried out by comparing distribution of pixels associated with a same color reagent, to a predefined threshold.

FIG. 2 is a high level flowchart diagram illustrating an aspect of a method 200 according to some embodiments of the present invention. The method include three major steps: capturing, normalization, and feature generation. Method 200 include the following: capturing, using a capturing device of a mobile device, an image containing: a dipstick having colored test reagents, and an array of patches containing a grid of grey patches and a plurality of reference color patches 210; deriving, based on the grid of grey patches, local illumination parameters associated with the colored test reagents and the plurality of reference color patches 220; determining whether illumination parameters are sufficient for interpreting the colored test reagent given mobile device capabilities 230. In case they are insufficient, notifying user that interpretation is not possible for the current captured image 240. In case they are sufficient, applying one or more image enhancement operation to the captured image, based on an analysis of the grid of grey patches indicative of local illumination conditions 250; and interpreting the one or more colored test reagents, by projecting the colored test reagents onto a vector of relevant reference color patches 260.

More specifically, the dipstick having color reagent is being captured by a capturing device of a mobile platform. Adjacent to the dipstick is an array of patches that is captured with the dipstick. The array of patched contains a grid of grey patches used for sampling the illumination conditions (enabling local assessment of illumination conditions) and reference color patches that have been carefully selected and were generated for the specific dipstick and contains all the knowledge that has been acquired for a myriad of possible illumination conditions, capturing devices and image processing abilities of possible mobile platforms.

The array of patches contains a grid of gray patches that are used for removing illumination change inside the convex hull defined by the grid points. This stage is aimed at removing local illumination variation. This is done either by assuming a piecewise linear luminance mapping or fitting a higher order per channel mapping function.

After local illumination changes are removed, the color patches are used for generating mobile device and illumination invariant color features. This is done by projecting the colors of each stick patch onto a vector defined by relevant reference color patches. This feature construction stage reduces changes in appearance created by the camera pipeline and the scene illumination without trying to explicitly calibrate the image or reconstruct absolute color coordinates as carried out by methods known in the art.

In accordance with some embodiments of the present invention, there are provided colored reference elements (for example colored hexagon patches as shown in FIG. 3) that are normalized but not calibrated which means they all have a near identical illumination component although their color (in the image) is not necessarily accurate (illumination component or camera pipeline artifacts are not completely removed).

In accordance with some embodiments of the present invention, each pair of such color patches is used to create a coordinate system and project the stick color onto that coordinate system, which creates an implicit non parametric calibration of the stick colors. The process is implicit since real calibrated stick colors are not provided in any stage. The process is denoted non parametric since there is no global model for mapping the colors of the entire image, rather there is a per patch calibration-like step that is based on reference data points.

In accordance with some embodiments of the present invention, the projected stick colors are used as components of the feature vector for classification.

FIG. 3 shows non-limiting example of a color board 30 exhibiting a grid of cube-like elements 310A and 310B having three sides, each having a different shade of grey, and a plurality of hexagon-shaped colored reference elements 330A and 330B used as reference values for feature vector normalization. Additionally, there is provided a designated location 320 for a dipstick which is not shown by itself. Color board 30 is pre-generated after a long process of learning the myriads of illumination conditions that may be presented when capturing the image using the arbitrary platform. The reference elements are carefully tailored per each type of dipstick for optimal performance. Additionally, the different capturing capabilities of many platforms (e.g., smart telephones, tablet PC and the like) are being studied. All of the above is being carefully used in some embodiments of the present invention in order to produce dipstick-specific color boards that have a very large dynamic range in the sense that many illumination conditions are within the operation boundary of the capturing process that is sufficient for proper interpretation of the medical data on the dipstick. The reference elements (used as reference values for feature vector normalization) shown in FIG. 3 have been carefully selected to have different shades of basic colors, and several textures.

According to some embodiments, color boards may be provided with a texture for matching or rectification and base colors for on the fly normalization. Additionally, the color board may apply a reverse effect of the response function of the capturing device of the arbitrary platform 10. In some embodiments, a representative response function is assumed. In others, different color boards are used for groups of known arbitrary platforms.

According to other embodiments, the color board is provided with arbitrary geometrical elements for simplifying dipstick extraction (when dipstick 20 has rectangular reagents), and exhibiting more gray levels for improved gamma correction.

According to other embodiments, the color board is provided with reference elements using two reference elements per color for a better normalization and specularity identification.

According to other embodiments, color board 30 is provided with reference elements having black borders around them for minimizing over smoothing of certain colors by some camera models. Additionally, uniform gray arbitrary geometrical elements may be are added for better normalization (again, due to over smoothing). Adding high contrast elements for enabling fast binary large object (BLOB) based color board rectification on the phone.

As will be appreciated by one skilled in the art, the aforementioned process of generating the calibration may be the product of trial and error process that can be implemented in various manners. It should be noted that the aforementioned guidelines may be used in order to generate further improvements for the calibration.

Aspects of the present invention may be embodied as a system, method or an apparatus. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system, and a "cloud".

The aforementioned flowchart and block diagrams illustrate the architecture, functionality, and operation of possible implementations of systems and methods according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe some embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method, comprising:

capturing, using a capturing device of a standard user equipment (UE) having specified image capturing and processing capabilities, an image of a dipstick having one or more colored test reagents, positioned on a calibration surface having a plurality of colored calibration elements, wherein the plurality of colored calibration elements includes at least two colored calibration elements per color and reflects a plurality of: illumination conditions, capturing capabilities of potential UEs, and response functions of capturing devices of the potential UEs;

determining, based on the at least two colored calibration elements per color, local illumination parameters associated with the captured image of the dipstick and the calibration surface;

applying one or more image enhancement operations to the captured image, to yield an enhanced image, based on predefined mapping between the determined local illumination parameters;

normalizing illumination of the captured image based on the local illumination parameters; and interpreting the one or more colored test reagents of the dipstick, based on the normalized illumination and the plurality of colored calibration elements of the calibration surface, in the enhanced captured image.

2. The method of claim 1, further comprising, in a case that the local illumination parameters are not within a set of predefined illumination boundary, instructing a user of the UE how to improve the local illumination parameters.

3. The method of claim 2, wherein the instruction to the user indicates a specified movement pattern of the UE in relation to the dipstick and the calibration surface.

4. The method of claim 1, wherein the one or more image enhancement operations comprises detecting portions of specular reflections coming from the colored calibration elements or the colored test reagents, and applying image processing algorithms to reduce the specular reflections.

5. The method of claim 4, wherein the detecting of portions of specular reflections is carried out by comparing pixels associated with a same colored calibration element or a same colored test reagent, to a predefined threshold.

6. The method of claim 1, wherein the one or more image enhancement operations comprise normalizing a color of each pixel of each colored test reagent, to yield, a uniform color, based on a normalization factor calculated based on the determined local illumination parameters and the specified image capturing and processing capabilities.

7. The method of claim 1, wherein the one or more image enhancement operations comprise normalizing a color of each pixel of each colored test reagent and colored calibration elements to achieve uniform illumination.

8. The method of claim 1, further comprising, in a case that the local illumination parameters are not within a predefined illumination boundary, informing a user that a proper interpreting of the dipstick by the UE is not possible.

9. The method of claim 1, wherein the one or more colored test reagents and the colored calibration elements are located, based on a specified layout, in prearranged locations.

10. The method of claim 1, wherein the calibration surface is generated based on data derived in a series of trials and error, in which a plurality of local illumination conditions were tested against a plurality of UEs.

11. The method of claim 1, wherein at least one of: shape, color, location, and texture of the colored calibration elements on the calibration surface are selected in an optimization process, configured to increase likelihood of a successful interpretation of the colored test reagents.

12. A system, comprising:
a user equipment (UE) having specified image capturing and processing capabilities, configured to capture an image of a dipstick having one or more colored test reagents, positioned on a calibration array surface having a plurality of colored calibration elements, the plurality of colored calibration elements includes at least two colored calibration elements per color and reflects a plurality of: illumination conditions, capturing capabilities of potential UEs, and response functions of capturing devices of the potential UEs; and
a computer processor configured to:
determine, based on the at least two colored calibration elements per color, local illumination parameters associated with the captured image of the dipstick and the calibration surface;
apply one or more image enhancement operations to the captured image, to yield an enhanced image, based on predefined mapping between the determined local illumination parameters;
normalize illumination of the captured image based on the local illumination parameters; and
interpret the one or more colored test reagents of the dipstick, based on the normalized illumination parameters and the plurality of colored calibration elements of the calibration surface, in the enhanced captured image.

13. The system of claim 12, wherein the computer processor is further configured, in a case that the local illumination parameters are not within a predefined illumination boundary, to instruct a user of the UE how to improve the local illumination parameters.

14. The system of claim 12, wherein the one or more image enhancement operations comprise detecting portions of specular reflections coming from the colored calibration elements or the colored test reagents, and applying image processing algorithms to reduce the specular reflections.

15. The system of claim 12, wherein the one or more image enhancement operations comprise determining, for each pixel at the captured image associated with one of the colored test reagents, a uniform color, based on a normalization factor calculated based on the determined local illumination parameters and the specified image capturing and processing capabilities.

16. The system of claim 12, wherein the one or more image enhancement operations comprise normalizing pixel colors of each colored test reagent and colored calibration elements to achieve uniform illumination.

17. The system of claim 12, wherein, in a case that the local illumination parameters are not within a predefined illumination boundary, the computer processor is further configured to inform a user that interpreting of the dipstick by the UE is not possible.

18. The system of claim 12, wherein the one or more colored test reagents and the colored calibration elements are located, based on a specified layout, in prearranged locations.

19. The system of claim 12, wherein the calibration surface is generated based on data derived in a series of trial and error, in which a plurality of local illumination conditions were tested.

20. A non-transitory computer-readable storage medium storing instructions that, when executed by at least one processor, cause the at least one processor to perform a method, comprising:
capturing, using a capturing device of a standard user equipment (UE) having specified image capturing and processing capabilities, an image of a dipstick having one or more colored test reagents, positioned on a calibration surface having a plurality of colored calibration elements, wherein the plurality of colored calibration elements includes at least two colored calibration elements per color and reflects a plurality of: illumination conditions, capturing capabilities of potential UEs, and response functions of capturing devices of the potential UEs;
determining, based on the at least two colored calibration elements per color, local illumination parameters associated with the captured image of the dipstick and the calibration surface;
applying one or more image enhancement operations to the captured image, to yield an enhanced image, based on predefined mapping between the determined local illumination parameters;
normalizing illumination of the captured image based on the local illumination parameters; and
interpreting the one or more colored test reagents of the dipstick, based on the normalized illumination and the plurality of colored calibration elements of the calibration surface, in the enhanced captured image.

* * * * *